United States Patent
Russell et al.

(10) Patent No.: US 7,468,329 B2
(45) Date of Patent: Dec. 23, 2008

(54) DEDOPING OF ORGANIC SEMICONDUCTORS

(75) Inventors: David Russell, Cambridge (GB); Thomas Kugler, Cambridge (GB); Christopher Newsome, Cambridge (GB); Shunpu Li, Cambridge (GB)

(73) Assignee: Seiko Epson Corproation, Tokyo (JP)

( * ) Notice: Subject to any disclaimer, the term of this patent is extended or adjusted under 35 U.S.C. 154(b) by 357 days.

(21) Appl. No.: 11/350,725

(22) Filed: Feb. 10, 2006

(65) Prior Publication Data
US 2006/0216851 A1   Sep. 28, 2006

(30) Foreign Application Priority Data
Mar. 22, 2000   (GB) .................... 0505878.9

(51) Int. Cl.
*H01L 21/469* (2006.01)
*H01L 23/58* (2006.01)

(52) U.S. Cl. ................... 438/780; 257/642

(58) Field of Classification Search .......... 438/99, 438/770–773, 780–784; 257/641–643
See application file for complete search history.

(56) References Cited

U.S. PATENT DOCUMENTS

| 4,545,112 | A | * | 10/1985 | Holmberg et al. ........... 438/158 |
| 2004/0232390 | A1 | | 11/2004 | Viswanathan |
| 2004/0247814 | A1 | * | 12/2004 | Sirringhaus et al. ........ 428/64.1 |

FOREIGN PATENT DOCUMENTS

DE   102 20 901 A1   11/2003

EP   0 374 487 A3   6/1990

OTHER PUBLICATIONS

MacDonald et al., Tetrakis N-Dimethylaminoethylene is an Extraoridinarily Sensitive Reagent for Oxygen, 1982, Analytical Letters, 15(A1), 57-66.*

(Continued)

*Primary Examiner*—Calvin Lee
(74) *Attorney, Agent, or Firm*—Oliff & Berridge, PLC

(57) ABSTRACT

The present invention relates to a method of dedoping an organic semiconductor comprising the step of contacting a doped organic semiconductor with a compound of formula (1):

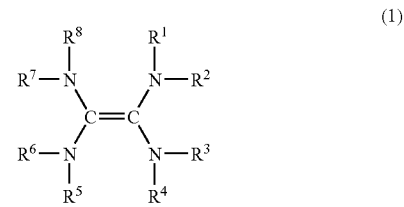

Figure 1A:
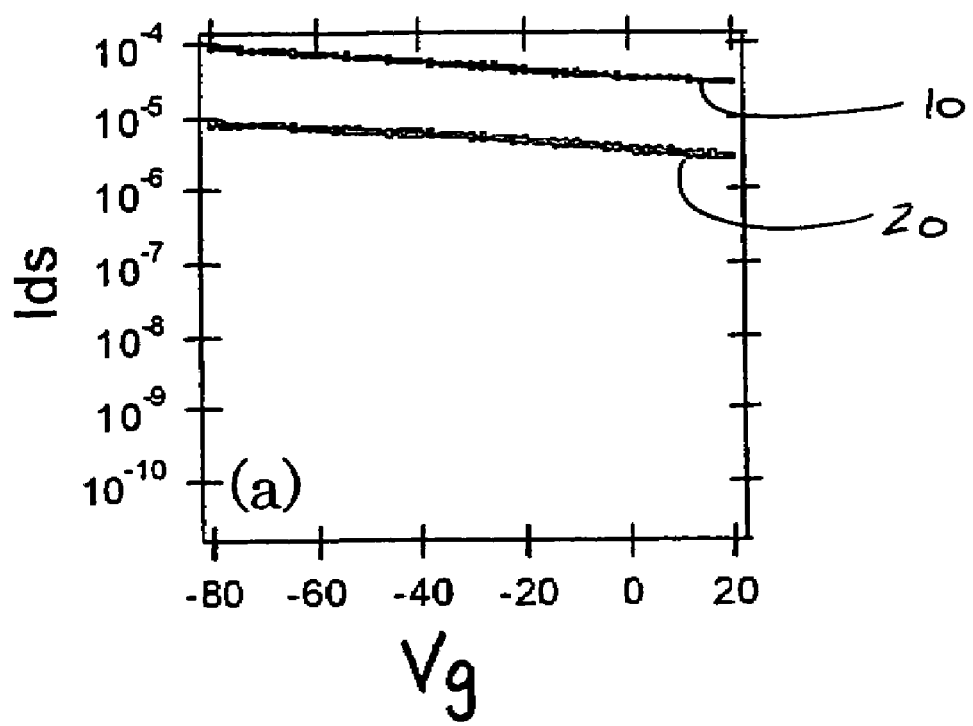

wherein $R^1$-$R^8$ each independently represents a hydrogen atom or a $C_1$-$C_6$ alkyl group which may be linear or branched and which may be optionally substituted with one or more hydroxyl groups and/or one or more halogen atoms and/or a $C_1$-$C_3$ alkoxy group;
one or more pairs of R groups which are not hydrogen may join to form a cyclic group according to the following pairings:
$R^1$ and $R^2$;
$R^2$ and $R^3$;
$R^3$ and $R^4$;
$R^4$ and $R^5$;
$R^5$ and $R^6$;
$R^6$ and $R^7$;
$R^7$ and $R^8$; and
$R^8$ and $R^1$.

14 Claims, 2 Drawing Sheets

OTHER PUBLICATIONS

Paolo Coppo et al., "Synthetic Routes to Solution-Processable Polycyclopentadithiophenes", Macromolecules 2003, vol. 36, pp. 2705-2711, 2003.

Zhenan Bao et al., "Soluble and processable regioregular poly(3-hexylthiophene) for thin film field-effect transistor applications with high mobility", Appl. Phys. Lett. 69 (26), pp. 4108-4110, Dec. 23, 1996.

D.B.A. Rep et al., "Doping-dependent charge injection into regioregular poly(3-hexylthiophene)", Organic Electronics 4, pp. 201-207, 2003.

Yoshihito Kunugi et al., "Charge transport in a regioregular poly(3-octylthiophene) film", J. Mater. Chem., vol. 10, 2673-2677 2000.

Andreas Schilder et al., "The role of TDAE for the magnetism in [TDAE]C60", New Journal of Physics 1, pp. 5.1-5.11, 1999.

Samjoo Lee et al., "Solvent Effects On the Characteristics of poly(3-alkylthiophene)'s", http://crm.korea.ac.kr/crm921_hslee.html, accessed Sep. 24, 2004.

K.R. Stalder et al., "Observations of strong microwave absorption in collisional plasmas with gradual density gradients", J. Appl. Phys., 72, (11), pp. 5089-5094, Dec. 1, 1992.

* cited by examiner

DEDOPING OF ORGANIC SEMICONDUCTORS

FIELD OF INVENTION

The present invention relates to a method of dedoping an organic semiconductor.

TECHNICAL BACKGROUND

Semiconductor materials have many applications in modern technology. In particular, semiconductor materials are useful in the production of microelectronic components such as transistors and diodes. Whilst inorganic semiconductors such as elemental silicon have traditionally been employed in the production of these semiconductor devices, recently other materials having semiconducting properties have become available and are being adopted in the microelectronic industry.

A particularly noteworthy class of non-silicon semiconductors is that of organic semiconductors. Several families of organic compounds are known which exhibit semiconductor properties. One advantage of these organic semiconductors is that they can be subjected to solution processing in contrast to traditional inorganic materials such as silicon.

One specific problem which is encountered when using organic semiconductors is that these compounds tend to spontaneously become doped in the presence of air due to absorption of oxygen molecules. This spontaneous doping increases the conductivity of the organic semiconductor but this is not so desirable as it decreases the on/off ratio of the semiconductor. The on/off ratio is the ratio of the conductivity of a given semiconductor incorporated in a transistor when a high voltage is applied through the gate electrode of the transistor (the "on" state) to the conductivity when no voltage is applied (bulk conductivity) (the "off" state). The on/off ratio should be as high as possible, and values of greater than 500 are preferred. Therefore, it is important to minimise the bulk conductivity of the material.

In practice, where an organic semiconductor is doped with oxygen, its bulk conductivity is high, so that the increase in conductivity as the transistor is switched on is only very small. Therefore, the observed on/off ratio for doped organic semiconductors is relatively low. In contrast, a high on/off ratio is observed in the same organic semiconductor after removal of the dopant because the bulk conductivity is low.

In view of the importance of maximizing the on/off ratio of a semiconductor, it is common practice to dedope organic semiconductors at some stage during their processing and then seal the dedoped material to protect it from subsequent doping by air.

One known way of dedoping an organic semiconductor is to expose it to liquid hydrazine [P. Coppo et al., Macromolecules 36, 2705, 2003]. However, the use of hydrazine in a factory production line is highly undesirable in part because hydrazine is carcinogenic and in part because it is highly flammable and explosive, it being a well known rocket fuel.

As an alternative to chemical treatments, physical treatment such as heating in an inert atmosphere (e.g. in a nitrogen atmosphere or in a vacuum) are known [Z. Bao et al., Appl. Phys. Letts., 69 26, 1996 & D. B. A. Rep et al., Organic Electronics 4, 201, 2003]. These treatments only increase the on/off ratio by a factor of approximately 10 and so are also unsatisfactory.

Furthermore, it is known to dedope organic semiconductors electrochemically by potential-step chronocoulometry [Y. Kunugi et al., J. Mater. Chem. 10, 2673, 2003]. It is impractical however to carry out this method on an industrial scale.

Other than the dedoping methods described above, alternative dedoping methods exist which are expected to result in some degree of dedoping. Amongst these, it has been suggested to add metal particles in the form of a fine powder to a doped organic semiconductor or to add nanoparticles or nanotubes such as for example titania nanotubes to the semiconductor to be treated. However, these methods are generally not considered to be particularly useful because they result in the deposition of the dedopant material in the organic semiconductor material which is undesirable as this affects the physical properties of the semiconductor and consequently has an impact on the performance of a device produced from the material.

A further problem associated with the known methods of dedoping is that they all have to be performed on the organic semiconductor in its bulk form, that is before the semiconductor is fashioned into a semiconductor device. This is inherently associated with disadvantages because, once the organic semiconductor has been dedoped, it must be ensured that it is not exposed to air as this would result in re-doping by oxygen. Therefore, it has until now been common practice to assemble microelectronic devices comprising organic semiconductors in an inert atmosphere in order to avoid re-doping of the organic semiconductor and then to seal the assembled organic semiconductor devices before removing them from the inert atmosphere. This puts severe restrictions on the production line set-up for producing such semiconductor devices. There is therefore a need for a more cost-effective way of producing semiconductor devices based on organic polymers which avoids the need to maintain an inert atmosphere during production. In view of the various deficiencies of the prior art dedoping methods, there has been a need for the development of an improved method of dedoping organic semiconductors. Accordingly, the present inventors have sought to develop a new dedoping method which does not suffer from the deficiencies of the prior art methods discussed above.

BRIEF DESCRIPTION OF THE INVENTION

The present invention provides a method of dedoping an organic semiconductor comprising the step of contacting a doped organic semiconductor with a compound of formula (1):

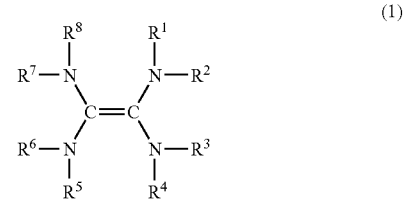

wherein $R^1$-$R^8$ each independently represents a hydrogen atom or a $C_1$-$C_6$ alkyl group which may be linear or branched and which may be optionally substituted with one or more hydroxyl groups and/or one or more halogen atoms and/or a $C_1$-$C_3$ alkoxy group;

two R groups which are not hydrogen may join to form a cyclic group according to the following pairings:
$R^1$ and $R^2$;

$R^2$ and $R^3$;
$R^3$ and $R^4$;
$R^4$ and $R^5$;
$R^5$ and $R^6$;
$R^6$ and $R^7$;
$R^7$ and $R^8$; and
$R^8$ and $R^1$.

Preferably, $R^1$-$R^8$ each independently represent a hydrogen atom or an unsubstituted $C_1$-$C_3$ alkyl group.

More preferably, $R^1$-$R^8$ each independently represent a methyl or ethyl group.

Most preferably, the compound of Formula (1) is tetrakis-dimethylaminoethylene (TDAE):

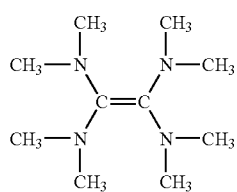

Preferably, the organic semiconductor is a poly(thiophene), a poly(arylamine) or a poly(phenylene vinylene).

More preferably, the organic semiconductor is a poly(thiophene). Most preferably, the poly(thiophene) is poly(3-hexylthiophene) (P3HT).

Preferably, the organic semiconductor to be treated is doped with oxygen atoms.

Preferably, the dedoping compound of Formula (1) is in the gas phase when it is brought into contact with the doped semiconductor. This advantageously allows dedoping to be carried out on an assembled semiconductor device immediately before sealing the device which in turn avoids the need for the entire production line to be kept in an inert atmosphere.

More preferably, if the dedoping compound is gaseous, then it can be used to treat a doped organic semiconductor comprised in a laminate having top and bottom layers derived from materials different from the doped organic semiconductor.

DETAILED DESCRIPTION OF THE INVENTION

The Dedoping Compound

The dedoping compound used in the method of the present invention is a compound of formula (1) as defined above.

Preferably, the dedoping compound is tetrakisdimethylaminoethylene (TDAE) as set out above.

Compounds of formula (1) have so far not been known to be useful in dedoping methods. TDAE is a known compound, known mainly for its function as an electron donor useful in the synthesis of organic charge transfer salts. The TDAE molecule has been the subject of relatively intense research recently because of its ability to react with the otherwise relatively inert "buckminsterfulerenes" and in particular $C_{60}$, to produce charge transfer salts. TDAE has also been the subject of research into plasma formation and has been shown to produce a plasma exhibiting strong microwave absorption when photoionised.

It is wholly unexpected that this class of compounds would be particularly useful in a dedoping method; this utility is not to be expected given the known properties of this class of compounds and no prior teaching would indicate their applicability to this purpose.

Turning now to the physical form of the dedoping compound, this is not so important as long as the molecules of the dedoping compound can come into contact with the organic semiconductor to be dedoped.

In a preferred embodiment of the present invention, the dedoping compound is present in the gas phase. This is preferable because it allows for flexibility in choosing when the dedoping method is carried out because it is possible to carry out the dedoping even after the organic semiconductor has been incorporated into an electronic device when the dedoping compound is gaseous. Thus where the organic semiconductor is present in a layered structure where it is not a surface layer and where either the layers above or below the organic semiconductor are permeable to the dedoping compound, the dedoping treatment of the present invention can be carried out after the device has been manufactured and immediately before a sealing process is carried out to seal the entire device to prevent subsequent contact with air.

Application of the method of the present invention to an organic semiconductor which is already incorporated into a layered device is highly preferred because it removes the necessity to carry out the production of the device under an inert atmosphere once the semiconductor layer has been formed; as long as the device is kept away from air in the time-period after dedoping and before sealing, the layered device would still be satisfactorily free from oxygen doping and have the required electronic characteristics as discussed above. Clearly, this represents a significant technical advance and allows a significant economic advantage to be obtained insofar as costs associated with keeping an extensive production line under an inert atmosphere can be avoided.

The Semiconductor

The method of the present invention can in principle be applied to any organic semiconductor. In practice, it is most useful where the organic semiconductor is one which spontaneously becomes doped through contact with air; among these types of semiconductors, polyfluorenes, polyarylamines and polythiophenes are mentioned. Polythiophenes are a class of organic semiconductors which are particularly prone to spontaneous doping by oxygen molecules; therefore, the method of the present invention is preferably applied to an organic semiconductor substrate of this type. A specific organic semiconductor to which the method of the present invention is particularly preferably applied is poly(3-hexylthiophene) (P3HT).

Whilst the method of the present invention is preferably used to dedope organic semiconductors which are doped with oxygen, the method might equally be applied to dedope semiconductors which have become doped with any other dopant.

Addressing now the form of the organic semiconductor to be dedoped, the method of the present invention can be carried out either on an organic semiconductor substrate which is in its bulk form or where the organic semiconductor has already been incorporated into a multilayer electronic device such as a thin film transistor (TFT) as discussed above. Where the organic semiconductor substrate is present as part of a device, it is possible to carry out the dedoping method of the present invention on the layered device itself even if the organic semiconductor layer in the device is not one of the outermost layers. In such a situation, the dedoping compound should be used in the gaseous state and the device should be configured so that the gaseous dedoping molecules can contact the organic semiconductor by diffusing through any layers which may surround it. Therefore, where the method of the present invention is applied to a layered device where the organic semiconductor is not at a surface, the layers above and/or below the organic semiconductor layer should be selected to be permeable to the gaseous dedoping agent.

If the method of the present invention is applied to an organic semiconductor device, it is desirable to apply the dedoping method as the last step before encapsulation of the device to shield it permanently from air.

Figure 1B:
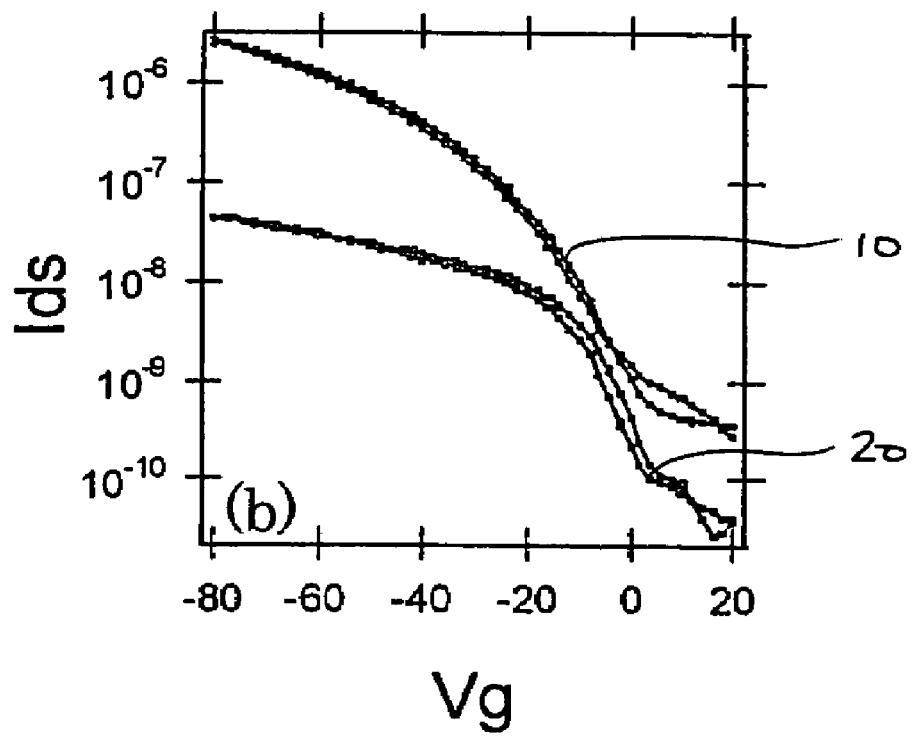
Figure 2:
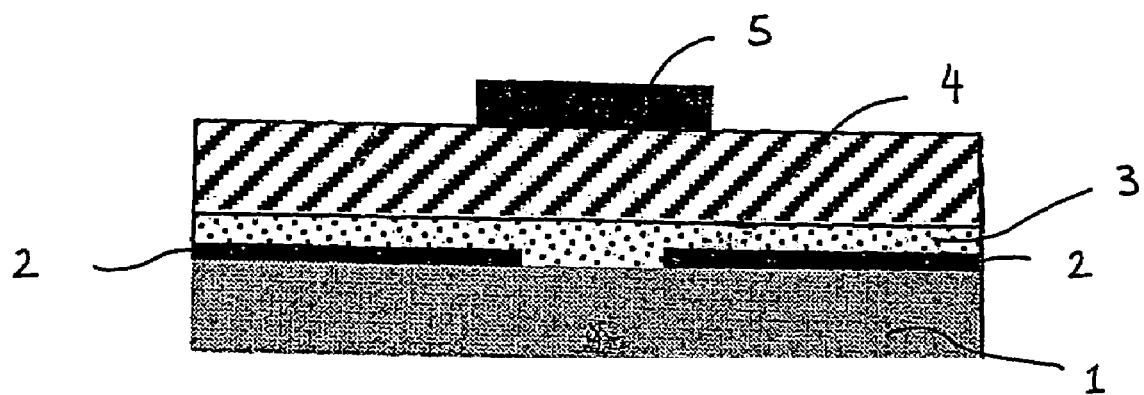

The present invention will now be described by means of a specific Example and with reference to the accompanying drawings in which:

FIG. 1 consists of two graphs (a) and (b), showing the transfer characteristics of a P3HT TFT before (a) and after (b) dedoping; and FIG. 2 schematically illustrates a thin film transistor in cross-section.

EXAMPLE

Gold source-drain electrodes (2) were defined on a glass substrate (1) by photolithography. Each of these electrodes (2) was in the shape of a rectangle having a width of 0.5 mm, a length of 3.0 mm and a thickness of 0.1 µm. The electrodes (2) were separated by a gap of about 10 µm. The glass substrate (1) bearing the electrode pattern was then cleaned in an ultrasonic bath, first in acetone and then in isopropyl alcohol for 15 minutes. It was then exposed to UV-ozone for 10 minutes after which it was transferred to a nitrogen glove box and baked for 15 minutes at 100° C.

A transistor of the basic type schematically illustrated in cross-section in FIG. 2 was then built up by deposition of a series of spin-coated layers whilst maintaining the substrate in the nitrogen glove box. A layer of P3HT (3) as the functional organic semiconductor was deposited from a 1% weight solution in chloroform, spin-coated at 1,000 rpm for 60 seconds. This layer was then dried on a hotplate for 20 minutes at 60° C. On top of this, an insulating layer (4) was formed by spin-coating at 2,000 rpm for 60 seconds an 8% by weight solution of polyvinylphenol (PVP) in isopropyl alcohol to give a ~600 nm film. The deposited insulating layer was then dried on a hotplate for 20 minutes at 60° C.

The device was then removed from the nitrogen environment and a gate electrode (5) ink-jet printed from a metal colloid in the atmosphere along the source-drain gap. The resulting thin film transistor device was then dried at 50° C. for 10 minutes before transfer back to a nitrogen glove box where its performance characteristics were measured using an Agilent 4156C Precision Semiconductor Parameter Analyser.

The transfer properties of the device were then measured at both −5 and −40 V.

The device was then exposed to gaseous TDAE for 60 hours, and its transfer properties were measured again at both −5 and −40 V.

The dedoped P3HT semiconductor device had a significantly reduced bulk conductivity ($4 \times 10^{-8}$ S/cm) compared to immediately before the dedoping treatment (where a bulk conductivity of $2 \times 10^{-3}$ S/cm was measured). Thus, the off current was lowered so that the on/off ratio was increased from being roughly 10 prior to the dedoping treatment to being roughly 1000 thereafter. The dedoping process was found not to significantly affect the current mobility of the material which was 0.01 $cm^2(vs)^{-1}$ before the dedoping treatment and was 0.007 $cm^2(vs)^{-1}$ thereafter.

The difference in electrical properties between the properties of the untreated P3HT device and the treated device can be seen in FIG. 1. Both FIGS. 1(a) and 1(b) are graphs showing gate voltage ($V_g$) on the horizontal axis and source-drain current (IdS) on the vertical axis. The lines 10 correspond to measurements conducted at a source-drain voltage of −40 volts whereas the lines 20 correspond to measurements conducted at a source-drain voltage of −5 volts. FIG. 1(a) represents measurements conducted on the P3HT sample prior to the dedoping treatment whilst FIG. 1(b) shows the characteristic of the same sample after the dedoping treatment described above in accordance with the method of the present invention.

The invention claimed is:

1. A method of forming a semiconductor device, the method comprising:
   forming a multilayer structure including a first film on a substrate and including a second film on the first firm, the first film comprising an organic semiconductor;
   applying a gas to the multilayer structure, the gas comprising a dedoping compound, the second film being configured to be permeable to the gas after forming the multilayer structure;
   wherein the dedoping compound has a structure represented by formula (I); and
   sealing the multilayer structure after applying the gas to the multilayer structure;

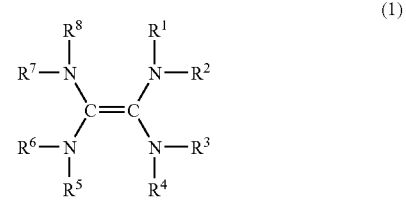

(1)

wherein $R^1$-$R^8$ each independently represents a hydrogen atom or a $C^1$-$C^6$ alkyl group which may be linear or branched and which may be optionally substituted with one or more hydroxyl groups and/or one or more halogen atoms and/or a $C_1$-$C_3$ alkoxy group;
   one or more pairs of R groups which are not hydrogen may join to form a cyclic group according to the following pairings:
   $R^1$ and $R^2$;
   $R^2$ and $R^3$;
   $R^3$ and $R^4$;
   $R^4$ and $R^5$;
   $R^5$ and $R^6$;
   $R^6$ and $R^7$;
   $R^7$ and $R^8$; and
   $R^8$ and $R^1$.

2. A method according to claim 1, wherein $R_1$-$R_8$ each independently represents a hydrogen atom or an unsubstituted $C_1$-$C_3$ alkyl group.

3. A method according to claim 2, wherein $R_1$-$R_8$ each independently represent a methyl or ethyl group.

4. A method according to claim 3, wherein the compound of Formula (1) is tetrakisdimethylaminoethylene (TDAE):

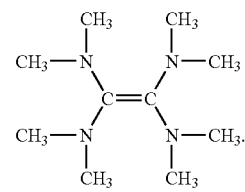

5. A method according to claim 1, wherein the organic semiconductor comprises poly(arylamine).

6. A method according to claim 1, wherein the organic semiconductor comprises poly(thiophene).

7. A method according to claim 6, wherein the poly (thiophene) is poly (3-hexylthiophene) (P3HT).

8. A method according to claim 1, wherein the organic semiconductor is doped with oxygen atoms.

9. A method according to claim 1, wherein the dedoping compound passes through the second film and contacts the first film while the gas is applied to the multilayer structure.

10. A method according to claim 1, the multilayer structure further including a third film positioned between the substrate and the first film.

11. The method according to claim 1, the organic semiconductor comprising polyfluorene.

12. The method according to claim 1, the organic semiconductor comprising poly(phenylenevinylene).

13. The method according to claim 1, the multilayer structure being a transistor.

14. A method of forming a semiconductor device, the method comprising:

forming a multilayer structure including a first film on a substrate and including a second film on the first firm, the first film comprising an organic semiconductor;

applying a gas to the multilayer structure, the gas comprising a dedoping compound, the second film being configured to be permeable to the gas after forming the multilayer structure, the deposing compound passing through the second film and contacting the first film while applying the gas to the multilayer structure; and sealing the multilayer structure after applying the gas to the multilayer structure.

* * * * *